United States Patent [19]

Katagi et al.

[11] Patent Number: 4,644,359

[45] Date of Patent: Feb. 17, 1987

[54] ANTENNA SYSTEM

[75] Inventors: Takashi Katagi; Seiji Mano; Isamu Chiba, all of Kanagawa, Japan

[73] Assignee: Mitsubishi Denki Kabushiki Kaisha, Tokyo, Japan

[21] Appl. No.: 556,919

[22] Filed: Dec. 1, 1983

[30] Foreign Application Priority Data

Dec. 2, 1982 [JP] Japan ................................ 57-211974

[51] Int. Cl.[4] ................................................ G01S 3/28

[52] U.S. Cl. .................................... 342/379; 342/380; 342/14

[58] Field of Search ................. 343/7 AG, 7 PL, 377, 343/379-384, 18 E; 375/102

[56] References Cited

U.S. PATENT DOCUMENTS

| | | | |
|---|---|---|---|
| 3,167,761 | 1/1965 | Le Parquier | 343/7 A |
| 3,202,990 | 8/1965 | Howells | 343/381 |
| 3,309,706 | 3/1967 | Huggins et al. | 343/383 |
| 3,482,245 | 12/1969 | Le Parquier | 343/377 |
| 4,268,829 | 5/1981 | Baurle et al. | 343/380 |

OTHER PUBLICATIONS

Adaptive Arrays, Sidney P. Applebaum, IEEE Transactions on Antennas and Propagation, vol. AP-24, No. 5, Sep., 1976, pp. 585-598.

*Primary Examiner*—Theodore M. Blum
*Assistant Examiner*—Bernarr Earl Gregory
*Attorney, Agent, or Firm*—Bernard, Rothwell & Brown

[57] ABSTRACT

Disclosed is an antenna system having a first antenna directed to receive a desired signal wave and a second antenna directed to receive only an interference signal wave superposed on the desired signal wave. Both signals received by the first and second antennas are combined and the amplitude and phase shift necessary for the second antenna signal to cancel the interference signal component existing in the first antenna signal is calculated from the combined signal. By combining the controlled second antenna signal with the first antenna signal, the desired reception signal having an improved S/N ratio can be obtained.

8 Claims, 9 Drawing Figures

FIG. 6
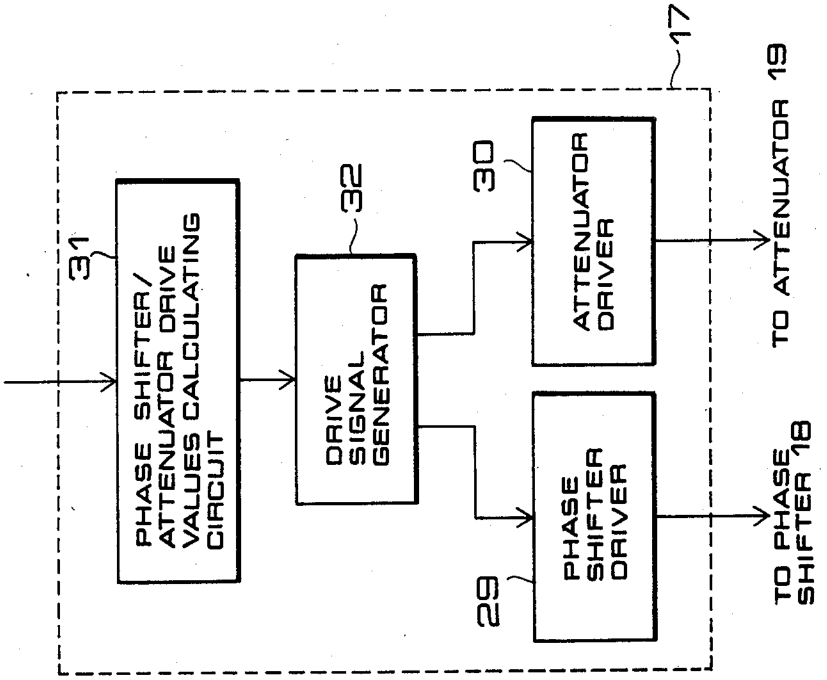
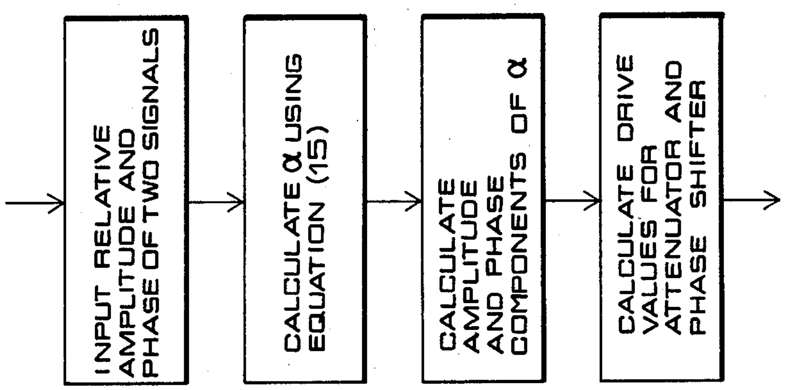
FIG. 7
FIG. 8
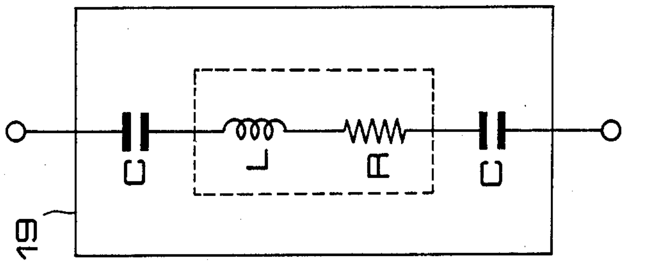

ANTENNA SYSTEM

FIELD OF THE INVENTION

The present invention relates to an antenna system incorporating a pair of antennas and, more particularly, to an antenna system for obtaining an improved signal-to-noise (S/N) ratio of the received signal through the signal processing to the signals received by these antennas.

DESCRIPTION OF THE PRIOR ART

A prior art technology for improving the S/N ratio of a signal received through the antenna is to use a pair of antenna and mix signals received by the antennas after the phase of one signal has been adjusted so that the most improved S/N ratio is obtained for the mixed signal, as disclosed for example in U.S. Pat. No. 3,202,990, entitled "Intermediate Frequency Side-lobe Canceller", by P. W. Howells.

Another method for improving the S/N ratio of the received signal is to use a main antenna which receives a desired signal wave superposing an interference signal thereto and a subsidiary antenna which directed to receive only the interference signal and both received signals are mixed as disclosed in publication IEEE TRANSACTION ON ANTENNA AND PROPAGATION, Vol. AP-24, No. 5, by Sidney P. Applebaum, Sept. 1976.

In order to clarify the features of the present invention, the system disclosed in the above-mentioned U.S. Pat. No. 3,202,990 will be briefed with reference to FIG. 1.

In the system of FIG. 1, a signal received by a main antenna 1 is conducted to a mixer 3 in which the signal is transformed to a signal S1 by being mixed with a local frequency signal from a local oscillator 4. While, on the other hand, a signal S3 received by a subsidiary antenna 2 is conducted to a mixer 5 so that it is mixed with a signal S4 from an amplifier 6. The mixer 5 provides a resultant signal S5 to a subtracting circuit 9, which produces a signal S2 from the amplitude difference between the signal S1 and the signal S5. The signal S2 is sent out to the external device (not shown) and also supplied to a cross correlator 8. The cross correlator 8 mixes the signal S2 from the subtracting circuit 9 with the signal S3 from the antenna 2, and supplies the resultant signal to a narrow-band filter 7. The filter 7 provides its output to the amplifier 6, which supplies the output signal S4 to the mixer 5 as mentioned above.

The signals S1, S2 and S3 are expressed in the following time functions related to the spurious frequency $\Omega$, the spurious amplitude J(t), the reception level m of main antenna 1, the reception level r of subsidiary antenna 2, the frequency $\delta$ of local oscillator 4, and the phase difference $\theta$ between the signals S1 and S2.I $$S1 = mJ(t)\exp[j(\Omega+\delta)t] \quad (1)$$

$$S2 = rJ(t)\exp[j(\Omega+\delta)t+\theta] \quad (2)$$

$$S3 = J(t)\exp[j(\Omega t+\theta)] \quad (3)$$

The signal S4 is expressed as:

$$S4 = rGJ^2(t)\exp[j(\delta t-\theta)] \quad (4)$$

where G is the gain of the amplifier 6. The signal S5, which is produced by mixing the signals S3 and S4 by the mixer 5, is expressed as:

$$S5 = rGJ^3(t)\exp[j(\Omega+\delta)t] \quad (5)$$

Since the signal S2 is the difference between the signal S1 and signal S5, the proportion of spurious elimination r/m(will be termed cancellation ratio) is given by the following equation.

$$r/m = \frac{1}{1+GJ^2(t)} \quad (6)$$

As can be seen from Equation (6), the cancellation ratio is determined from the level of the interference signal wave, and therefore, the S/N ratio cannot be obtained stably. Another problem of the prior art system in practice is that a time lag for the signal S2 to converge its level may be increased depending on the level of the interference signal wave.

Accordingly, it is an object of the present invention to provide an antenna system which provides a signal of an improved S/N ratio within a certain period.

Another object of the present invention is to provide an antenna system which effectively eliminates the interference signal wave without being affected by the level thereof.

SUMMARY OF THE INVENTION

The present invention resides in an improved antenna system incorporating a first antenna for receiving a desired signal wave including an interference signal wave and a second antenna directed to receive only the spurious wave, wherein signals received by the first and second antennas are mixed after frequency conversion by using supèr-heterodyne technique in such a polarity relationship that the interference components in both signals cancel with each other, the amplitude and phase shift for the second antenna signal to nullify the interference signal superposed in the first antenna signal are calculated from the mixed signal, so that the desired signal is selectively extracted by adding the second antenna signal having the controlled amplitude and phase with respect to the first antenna signal.

BRIEF DESCRIPTION OF THE DRAWINGS

FIG. 6 is a block diagram showing the arrangement of the controller shown in FIG. 2;

FIG. 7 is a flowchart showing the calculating procedure of the calculating circuit shown in FIG. 6;

FIG. 8 shows a fundamental equivalent circuit of the attenuator shown in FIG. 2.

DESCRIPTION OF THE PREFERRED EMBODIMENT

Figure 2:
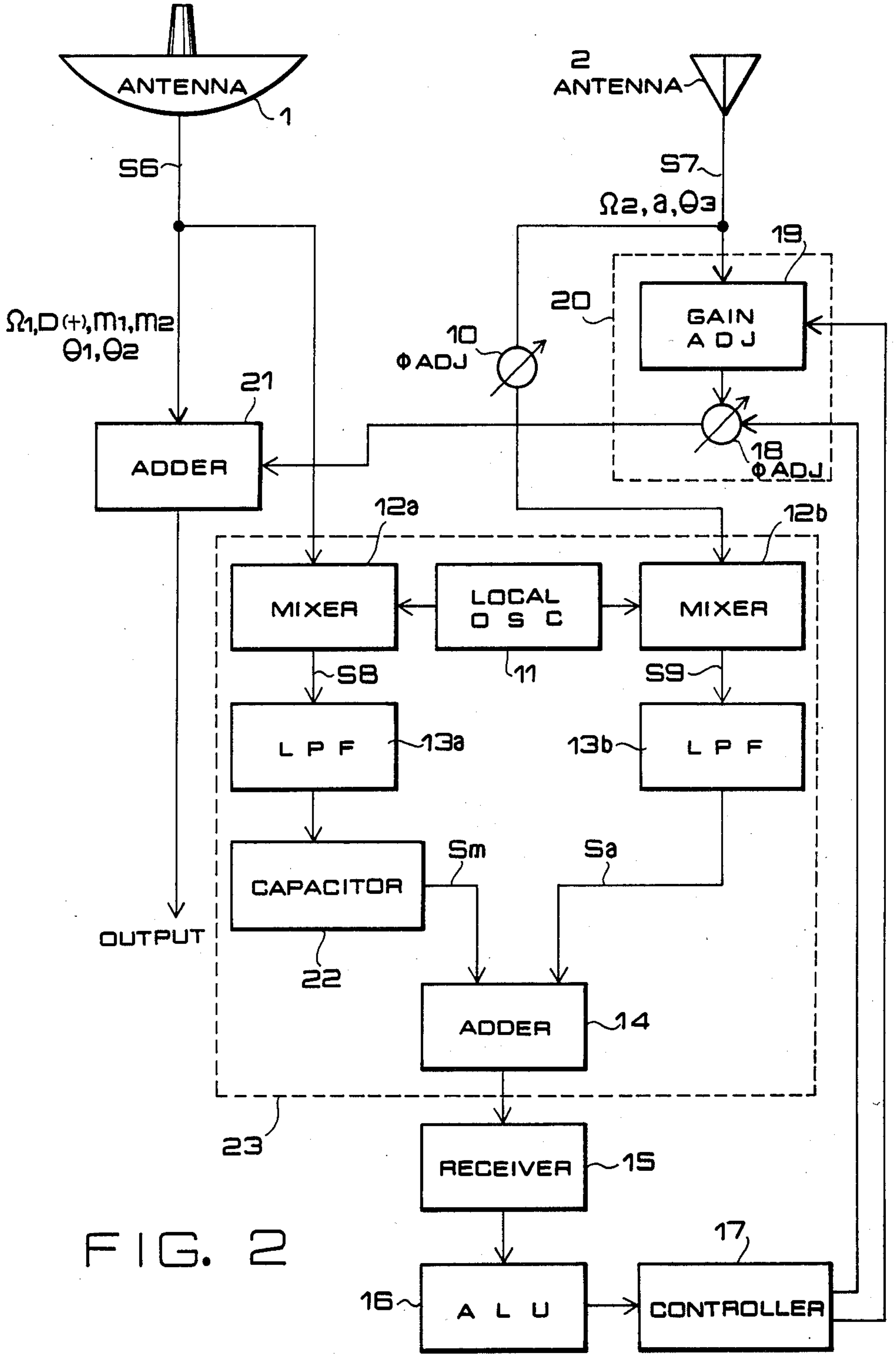
FIG. 2 is a block diagram showing an antenna system embodying the present invention.

Referring now to FIG. 2, there is shown the antenna system embodying the present invention. Antenna 1 provides a signal S6 to an adder 21 and mixer 12*a*. The mixer 12*a* produces a signal S8, which is mixed with a signal from a local oscillator 11, and the resultant signal is conducted through a low-pass filter 13*a* and DC blocking capacitor 22 to an adder 14. On the other hand, antenna 2 provides a signal S7 to a phase shifter ($\phi$ ADJ) 10 and attenuator 19. The phase shifter 10 makes a certain phase shift of known value for the signal S7 and supplies it to a mixer 12*b* so that it is mixed with a signal from the local oscillator 11. The mixer 12*b* provides a signal S9 to a low-pass filter 13*b*, which in turn provides a signal Sa to the adder 14.

The adder 14 adds the signal Sm from the blocking capacitor 22 to the signal Sa from the filter 13*b*, and supplies the resultant signal to a receiver 15. The receiver 15 is of the common arrangement, providing the demodulated output to an arithmetic logic unit 16, which executes a predetermined computational program before the resultant signal is supplied to a controller 17. The controller 17 operates on the attenuator 19 to adjust the amplitude of the antenna input, and the output of the attenuator is fed to a phase shifter 18 to control the phase shift. The signal from the phase shifter 18, with its amplitude and phase shift being controlled, is supplied to the adder 21 so that it is added to the signal S6 as mentioned above.

Before explaining the operation of the foregoing arrangement, the following gives the definition of parameters used in the equations.

$\Omega 1$: Frequency of desired signal wave
$\Omega 2$: Frequency of interference signal wave
D(t): Amplitude of desired signal wave
ml: Reception level of desired signal wave on antenna 1
m2: Reception level of interference signal wave on antenna 1
a: Reception level of spurious wave on antenna 2
$\theta 1$: Phase of desired signal wave on antenna 1
$\theta 2$: Phase of interference signal wave on antenna 1
$\theta 3$: Phase of interference signal wave on antenna 2

The signal S6 from the antenna 1 including the interference signal wave superposed on the desired signal wave, and the signal S7 from the antenna 2 directed to receive only the interference wave are expressed in the following equations.

$$S6 = m_1D(t)\exp[j(\Omega_1t+\theta_1)] + m_2J(t)\exp[j(\Omega_2t+\theta_2)] \quad (7)$$

$$S7 = aJ(t)\exp\,[j\,(\Omega_2t+\theta_3)] \quad (8)$$

By mixing respective signals S6 and S7 with a signal of a frequency Ω1 from the local oscillator 11, the mixers 12*a* and 12*b* provide their output signals S8 and S9, respectively, as expressed in the following equations.

$$S8 = m_1D(t)\exp[j(2\Omega_1t + \theta_1)] + m_2J(t)\exp[j(\Omega_1t + \Omega_2t + \theta_2)] + m_1D(t)\exp[j\theta_1] + m_2J(t)\exp[j(\Omega_1t - \Omega_2t + \theta_2)] \quad (9)$$

$$(10)$$

$$S9 = aJ(t)\exp[j(\Omega_1t + \Omega_2t + \theta_3)] + aJ(t)\exp[j(\Omega_1t - \Omega_2t + \theta_3)]$$

The signals S8 and S9 with the high frequency components filtered out by the filters 13*a* and 13*b*, then provide the signals S10 and Sa as expressed in the following equations, $$S10 = m_1D(t)\exp[j\theta_1] + m_2J(t)\exp[j(\Omega_1t - \Omega_2t + \theta_2)] \quad (11)$$

$$Sa = aJ(t)\exp[j(\Omega_1t - \Omega_2t + \theta_3)] \quad (12)$$

The capacitor 22 blocks the DC component included in the signal S10 and supplies the adder 14 with the signal Sm as expressed in the following equation.

$$Sm = m_2J(t)\exp[j(\Omega_1t - \Omega_2t + \theta_2)] \quad (13)$$

In consequence, the adder 14 receives only interference signal components as expressed in Equations (12) and (13) received by the antenna 1 and 2. The adder 14 sends its output through the receiver 15 to the arithmetic logic unit 16, which calculates the differences in amplitudes and phases between the signals Sm and Sa based on the output of the adder 14.

Figure 1:
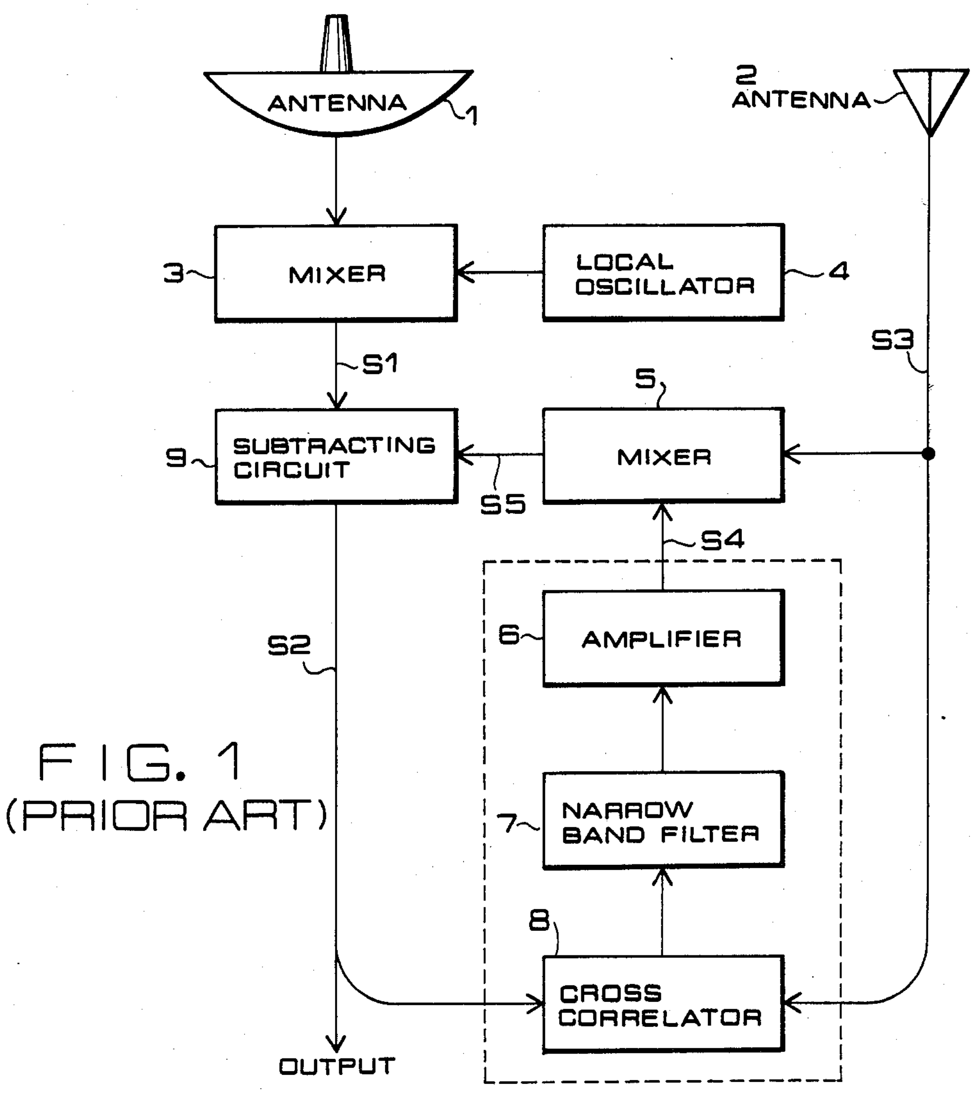
FIG. 1 (PRIOR ART)
FIG. 1 is a block diagram showing the conventional antenna system.
Figure 3:
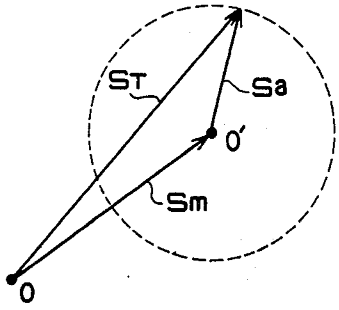
FIG. 3 is a vectorial diagram showing two input signals of the adder shown in FIG. 2.

FIG. 3 shows the vectorial relationship between the two input signals supplied to the adder 14. In the diagram, vector $S_T$ results from the vector sum for the signals S8 and S9, and corresponds to the output signal of the receiver 15. The vector of signal Sm rotates around a center O, the vector of signal Sa rotates around a center O', and the vector of signal $S_T$ varies along a circle of radius Sa centered by the point O' (shown by the dashed circle). The amplitude difference and phase difference between the signals Sa and Sm can be calculated from the maximum and minimum amplitudes ratio (Sm+Sa)/(Sm−Sa), and the amount of phase shift of the phase shifter 10 providing the maximum and minimum amplitudes. Following the computation for the amplitude difference and phase difference, the arithmetic logic unit 16 operates to figure out the modification factor $\alpha$ which satisfies the following equation.

$$Sm + \alpha Sa = 0 \quad (14)$$

The modification factor $\alpha$ is received by the controller 17, which controls the gain of the attenuator 19 and the phase shift of the shifter 18 in accordance with the modification factor $\alpha$ and supplies the resultant signal to the adder 21. The adder 21 adds the controlled signal from the shifter 18 to the signal S6 from the antenna 1, and consequently, the interference signal component existing in the signals is eliminated as can be seen from Equation (14). Namely, even if the interference signal wave has a varying amplitude and phase, the corrective operation of the system keeps up with the variation so as to eliminate the interference component at the output of the adder 21, whereby the reception signal derived from the output has an improved S/N ratio.

Figure 4:
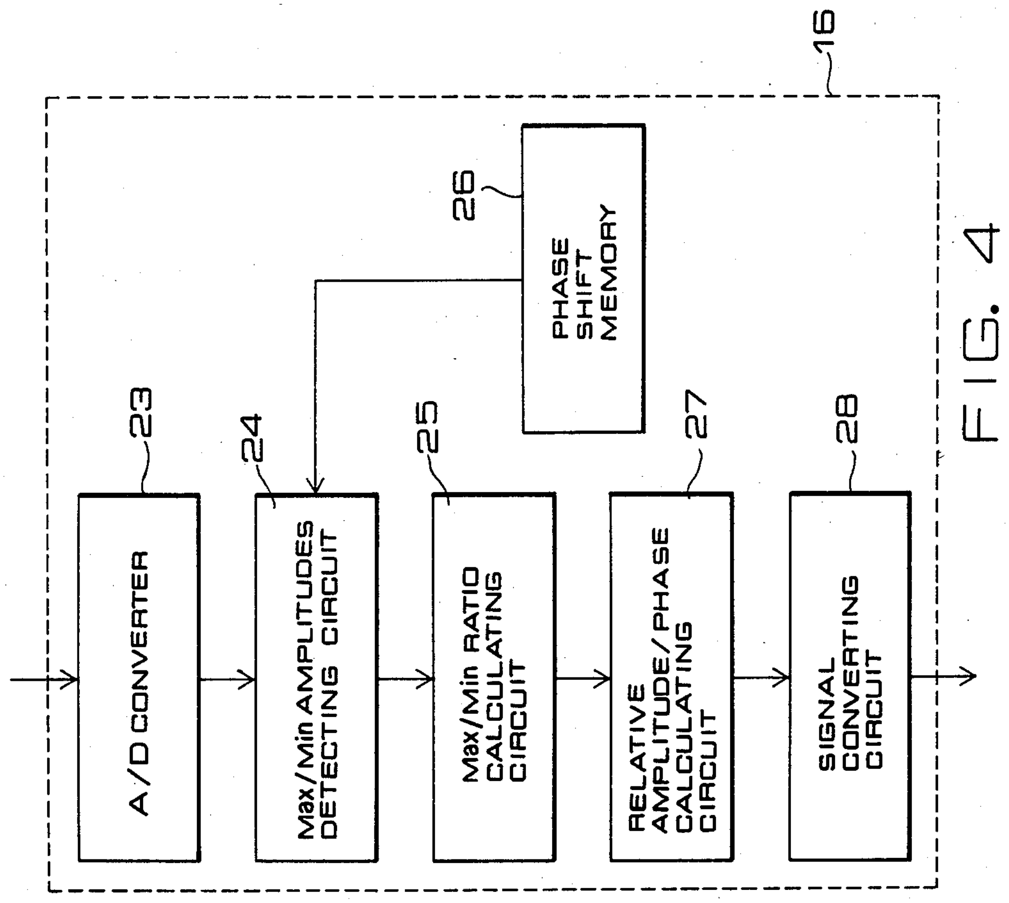
FIG. 4 is a block diagram showing the arrangement of the arithmetic logic unit shown in FIG. 2.

FIG. 4 is a block diagram showing the arrangement of the arithmetic logic unit 16. The arrangement includes an A/D converter 23, a circuit 24 for detecting the maximum and minimum values of the amplitude, a circuit 25 for providing the ratio of the maximum value to the minimum value, a memory 26 for storing the value of phase shift produced by the phase shifter, a circuit 27 for calculating the relative amplitude and phase of the combined signal components based on the ratio of the maximum to minimum values and the phase shift of the phase shifter between the maximum and minimum values, and a signal converting circuit 28 which converts the resultant signal from the circuit 27 into a signal suited to the controller 17.

Figure 5:
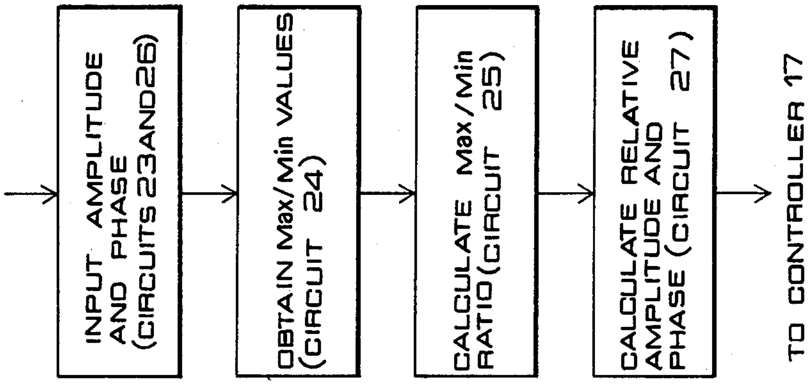
FIG. 5 is a flowchart showing the operation of the arrangement including the circuits shown in FIG. 4.

The operation of the arrangement including the circuits 24, 25, 26, 27, and 28 is shown by the flowchart of FIG. 5. . FIG. 6 is a block diagram showing the arrangement of the controller 17. The arrangement includes a drive circuit 29 for the phase shifter 18, a drive circuit 30 for the attenuator 19, a circuit 31 for calculating the amount of drive for the phase shifter 18 and the amount of drive for the attenuator 19 in accordance with the signal from the arithmetic logic unit 16, and a drive signal generating circuit 32 which generates the drive signals for the phase shifter 18 and attenuator 19 based on the result of calculation by the circuit 31. The calculating procedure of the circuit 31 is shown by the flowchart of FIG. 7.

The attenuator 19 is, for example, of a variable attenuator as shown by the fundamental equivalent circuit in FIG. 8, in which C, L and R represent a capacitance, inductance and resistance, respectively, and the degree of attenuation is varied by varying the values of L and R electrically.

The following shows the particular procedures of calculation. The amplitude of the signal received by the receiver is converted into digital signals by the A/D converter 23 shown in FIG. 4 and fed to the circuit 24 which calculates the variation of amplitude corresponding to the phase shift. The circuit 24 uses the amplitude variation $f_i$ and the unit phase shift $\Delta i$ of the phase shifter 10 read out from the memory 26 to determine the values of A, $\Delta o$ and B based on the method of least squares for the equation:

$$f(\Delta i)=A\cos(\Delta o+\Delta i)+B \quad (16)$$

Here, the $\Delta i$, when a 5-bit phase shifter is used for example, takes the following values.

$$\Delta i=0°, -11.25°, -22.5°, \ldots, 11.25°\times(i-1) \quad (17)$$

The circuit 25 operates to obtain the maximum value $f_{max}$ and minimum value $f_{min}$ of $f(\Delta i)$ in Equation 16, and their ratio by the following equations.

$$f_{max} = \sqrt{B+A} \quad (18)$$

$$f_{min} = \sqrt{B-A} \quad (19)$$

$$r = \sqrt{\frac{B+A}{B-A}} \quad (20)$$

Next, the circuit 27 calculates the relative amplitude k and relative phase x in accordance with the following equations (21), (22) and (23).

$$k = \frac{\Gamma}{\sqrt{1+2\Gamma\cos\Delta o+\Gamma^2}} \text{ or } \frac{1}{\sqrt{1+2\Gamma\cos\Delta o+\Gamma^2}} \quad (21)$$

$$X = \tan^{-1}\frac{\sin\Delta o}{\cos\Delta o+\Gamma} \text{ or } \tan^{-1}\frac{\sin\Delta o}{\cos\Delta o+1/\Gamma} \quad (22)$$

$$\Gamma = \frac{r-1}{r+1} \quad (23)$$

Figure 9:
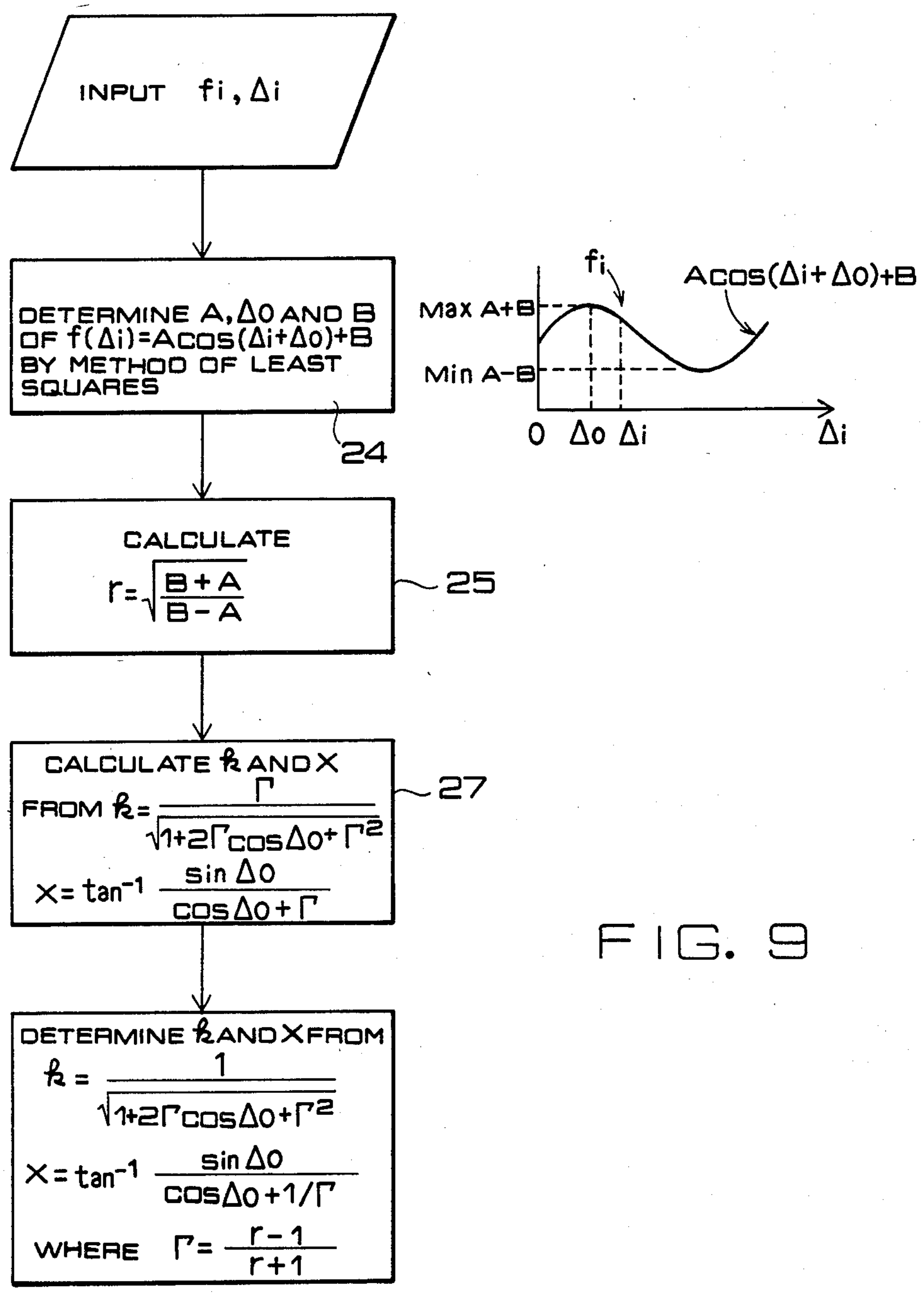
FIG. 9 is a flowchart showing the operation of the arithmetic logic shown in FIG. 4.

FIG. 9 shows in flowchart the operation of the calculator.

Next, the values of relative amplitude and phase obtained by the circuit 27 is converted by the signal converting circuit 28 into a code suited to the controller 17. Then, the drive value calculating circuit 31 for the phase shifter and attenuator determines the amounts of drive for the phase shifter 18 and attenuator 19. Both the phase shifter 18 and attenuator 19 are of 5-bit control, and for the attenuator having the maximum degree of attenuation of Amax, the drive value p for the phase shifter 18 and the drive value a for the attenuator 19 are expressed as follows.

$$p = NINT\left(\frac{X}{360/2^5}\right) \quad (24)$$

$$a = NINT\left(\frac{k}{A\max/2^5}\right) \quad (25)$$

where NINT(Y) represents an integer nearest to Y.

Subsequently, the phase shifter drive circuit 29 and attenuator drive circuit 30 evaluate the values p and a in binary notation. For example, when p=1 and $$a = 1, \quad (26)$$

$$p = (00001)$$

and $$a = (00001) \quad (27)$$

The voltages of the phase shifter 18 and attenuator 19 at terminals corresponding to the expressions (26) and (27) are switched ON and OFF with respect to the reference level. In case the reference level is 5 volts, and bits 1, 2, 3, 4, and 5 of a binary number Z correspond to the 1st, 2nd, 3rd, 4th, and 5th terminals on the phase shifter 18 and attenuator 19, the amplitude and phase of a signal incoming via the subsidiary antenna 2 are adjusted by placing the 1st terminal at 5 volts and remaining terminals at 0 volt for both of the phase shifter 18 and attenuator 19.

What is claimed is:

1. An antenna system having a first antenna for receiving a desired signal wave superposing an interference signal wave thereon and a second antenna directed to receive only said interference signal wave, comprising:

a signal processing means which combines signals received by said first and second antennas so as to extract a component of said interference signal wave;

an arithmetic and control means which calculates the amplitude difference and phase difference between said interference signal waves received by said first and second antennas from the output of said signal processing means, and calculates a gain and a phase shift necessary for the second antenna signal to cancel the interference signal waves existing in the signals received by said first and second antennas;

an adjusting means which adjusts the amplitude of the signal received by said second antenna in accordance with a setup gain of said control means;

a phase shift means connected in series to said adjusting means and adapted to shift the phase of the signal received by said second antenna in accordance with a setup phase shift of said control means; and an adding means which adds the signal received by said second antenna and processed through said adjusting means and phase shift means to the signal received by said first antenna.

2. An antenna system according to claim 1, wherein said signal processing means comprises;

an oscillator for generating a frequency signal which has the frequency equal to that of the desired signal wave;

first and second mixers which mix the signal from said oscillator with the signals received by said first and second antennas, respectively;

first and second filter means which extract a low frequency component from output signals of said first and second mixers; and an adding means which adds output signals from said first and second filter means.

3. An antenna system according to claim 2, wherein said first filter means includes a DC blocking capacitor.

4. An antenna system comprising:

a first antenna for receiving a desired signal wave with an interference signal wave superimposed thereon;

a second antenna directed for receiving only the interference signal wave;

first variable phase shift means connected to the second antenna for producing a measuring signal with successive selected phase shifts from the second antenna signal wave;

signal processing means which combines said measuring signal with a signal wave from said first antenna so as to generate a summation signal of the interference components of the measuring signal wave and the signal wave from the first antenna;

arithmetic and control means including means for operating the first variable phase shift means to produce a plurality of successive different phase shifts in the measuring signal, amplitude measuring means for measuring the amplitudes of the summation signal from signal processing means at the corresponding different phase shifts in the measuring signal, and means responsive to the measured amplitudes and values of the different phase shifts for calculating both an amplitude difference and a phase difference between the interference signal components of the signal waves received by the first and second antennas;

amplitude adjusting means connected to the second antenna for producing an interference cancellation signal in accordance with the calculated amplitude difference of said control means;

second variable phase shift means connected in series with aid adjusting means for shifting the phase of the interference cancellation signal in accordance with the calculated phase difference of said control means; and adding means connected to the first antenna for adding the amplitude adjusted and phase shifted interference cancellation signal to a signal from the first antenna to produce an output signal wherein the interfernce signal wave is cancelled from the desired signal wave.

5. An antenna system as claimed in claim 4 wherein the signal processing means includes local oscillator means for generating a signal having the frequency of the desired signal wave, first and second mixer means for mixing the respective first antenna signal wave and measuring signal with the local oscillator signal, first and second filter means for passing only interference signal derived frequency components of the respective outputs of the first and second mixers, and adding means for combining the outputs of the first and second filter means for generating the summation signal.

6. An antenna system as claimed in claim 5 wherein the first filter means includes a DC blocking capacitor.

7. An antenna system as claimed in claim 4 wherein the amplitude measuring means includes analog-to-digital converter means for converting the amplitudes of the summation signal into digital values.

8. An antenna system as claimed in claim 7 wherein the calculating means includes means for determining maximum and minimum values of the summation digital values by a method of least squares, means for calculating the ratio of the maximum and minimum values, means for calculating a relative amplitude adjustment for the amplitude adjusting means from the ratio of maximum and minimum values and the phase difference, and means for calculating the relative phase shift for the second variable phase shift means from the phase difference and the ratio of the maximum and minimum values.

* * * * *